Dec. 11, 1951   F. J. WHITE ET AL   2,578,116
RECEPTACLE TILTING AND UNLOADING DEVICE
Filed Feb. 8, 1950   4 Sheets-Sheet 1

INVENTOR.
FRANK J. WHITE
BY   CARL W. SCOTT
Arnold and Mathis
ATTORNEYS

Dec. 11, 1951  F. J. WHITE ET AL  2,578,116
RECEPTACLE TILTING AND UNLOADING DEVICE
Filed Feb. 8, 1950  4 Sheets-Sheet 2

INVENTOR.
FRANK J. WHITE
CARL W. SCOTT
BY
Arnold and Mathes
ATTORNEYS

Dec. 11, 1951  F. J. WHITE ET AL  2,578,116
RECEPTACLE TILTING AND UNLOADING DEVICE
Filed Feb. 8, 1950  4 Sheets-Sheet 3

INVENTOR.
FRANK J. WHITE
CARL W. SCOTT
BY
Arnold and Mathis
ATTORNEYS

Dec. 11, 1951 F. J. WHITE ET AL 2,578,116
RECEPTACLE TILTING AND UNLOADING DEVICE
Filed Feb. 8, 1950 4 Sheets-Sheet 4

INVENTOR.
FRANK J. WHITE
BY CARL W. SCOTT
Arnold and Mathis
ATTORNEYS

Patented Dec. 11, 1951

2,578,116

UNITED STATES PATENT OFFICE 2,578,116

RECEPTACLE TILTING AND UNLOADING DEVICE

Frank J. White and Carl W. Scott, Beatrice, Nebr., assignors to Tote Engineering, Inc., Seattle, Wash., a corporation of Washington Application February 8, 1950, Serial No. 143,094

16 Claims. (Cl. 214—1.1)

Our invention relates to receptacle tilting and unloading apparatus.

More particularly this invention relates to tilting and unloading apparatus for bins or receptacles of the type and design disclosed in our co-pending application Serial Number 54,114, filed October 12, 1948.

When bins or large containers filled with granular or finely divided material are to be discharged of their contents, the said material does not tend to completely discharge from or empty the bin because of the character of granular or finely divided material in not tending to flow or seek a level because of gravity. It is commonly expressed in the art that most granular and finely divided materials are without head and do not tend to flow if their direction of travel is changed to the horizontal. The present invention is designed particularly for unloading bins filled with granular, finely divided or fluent materials, and in the interest of simplicity such materials are referred to hereinafter as granular materials.

It is an object of the present invention to provide a tilt rack or angularly movable bin supporting member which tends to properly center or aline bins even though they have not been precisely initially located on the tilt rack.

It is a further object of the present invention to provide vibrator means operable adjacent a wall of a container or bin to aid in discharging granular material from the bin.

It is a further object of the invention to provide a tilt rack having a hopper of a construction so that the hopper forms a dust-tight seal about the door opening so that finely divided material, as flour, does not tend to sift by or leak past the seal between the hopper and the wall of the bin in which is provided the discharge opening.

It is a further object of this invention to provide tilting and unloading mechanisms to be employed in connection with a plurality of bins with a common discharge means so that such discharge means functions as a blender or mixer so that equal or unequal parts of material from a plurality of bins may be delivered to such common discharge.

It is a further object of the present invention to provide unloading mechanism of a nature and kind to eliminate bearing problems incident to bearings employed with screw conveyors, which conveyors are moving granular and finely divided materials.

It is a further object of the invention to provide a simple, efficient, and substantially foolproof bin tilting and unloading apparatus which is efficient in operation, economical in construction, reliable in operation, and of a design readily adapted for mass production.

The above-mentioned general objects of this invention, together with others inherent in the same, are attained by the devices illustrated in the accompanying drawings, throughout which drawings like reference numerals indicate like parts:

Figure 1:
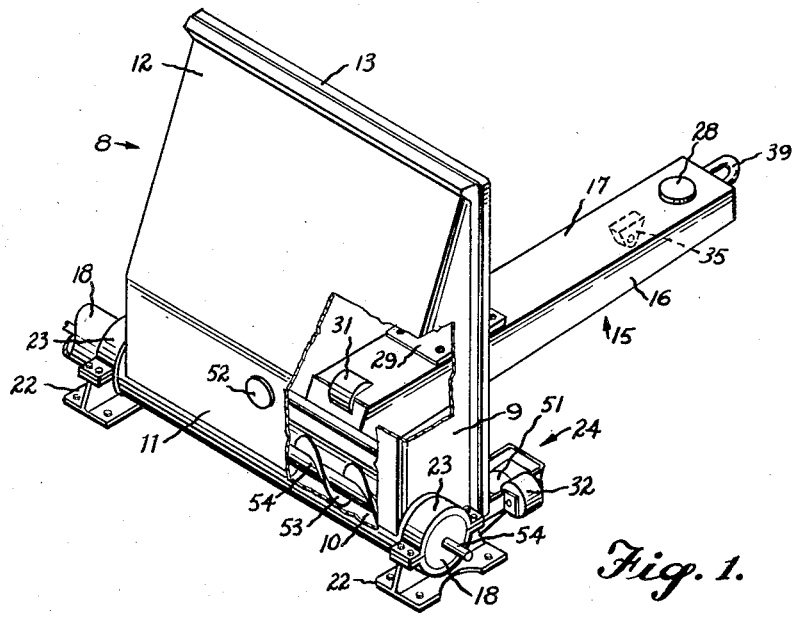
Figure 1 is a perspective view, with parts broken away, of a device embodying this invention.
Figure 2:
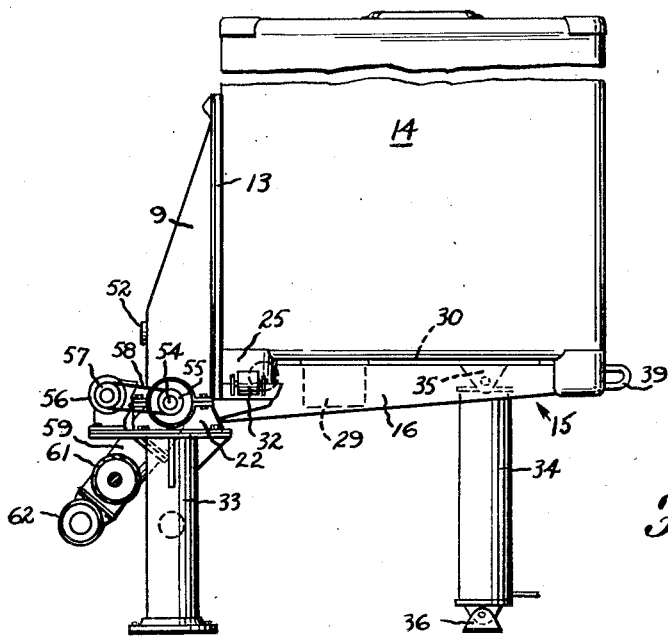
Fig. 2 is a view in end elevation of the structure shown in Fig. 1, with a bin in place on said structure of Fig. 1, and with one form of tilting and conveying mechanism shown.
Figure 5:
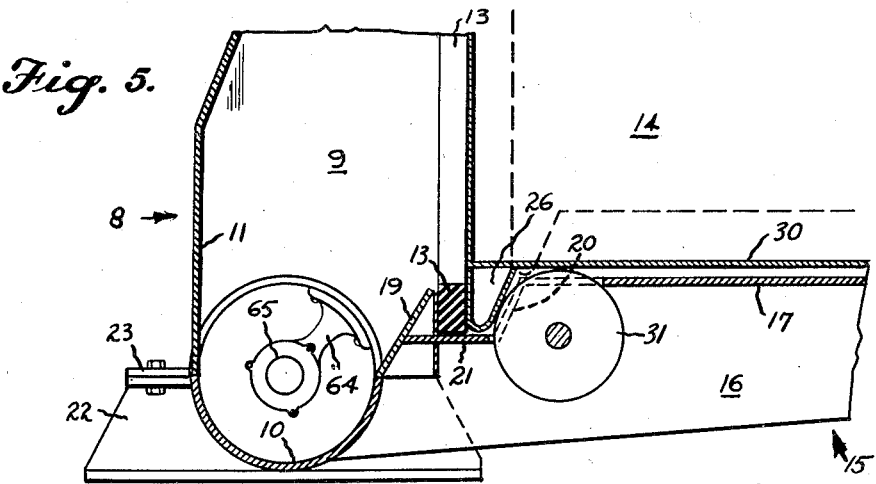
Fig. 5 is an enlarged view in section, with parts shown in elevation, taken substantially on broken line 5—5 of Fig. 3, with a fragment of a bin shown in full and dotted line positions and with the conveyor screw removed from the conveyor housing.
Figure 7:
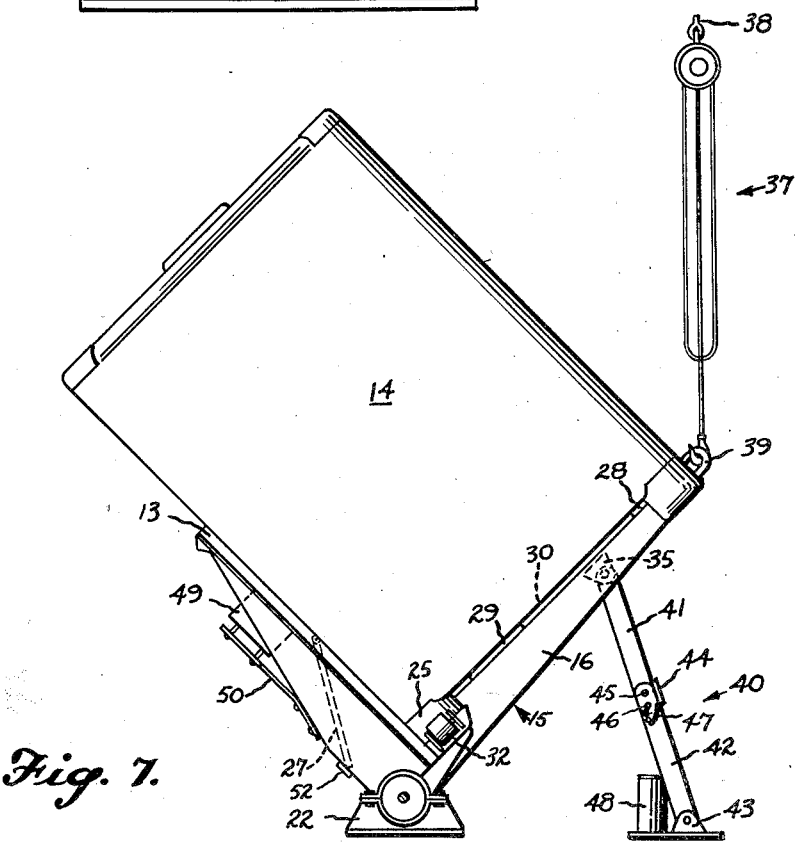
Fig. 7 is a view in end elevation of a modified form of this invention.

Referring now to Fig. 1 of the drawings, the construction shown comprises a hopper generally numbered 8. The hopper 8 preferably comprises end walls 9 which taper outwardly or have a triangular upper portion, as shown. The end walls 9 are connected to an arcuate bottom wall 10, and back walls 11 and 12. The front portions of walls 9, 12 and 19 are surrounded by a gasket 13, which may be formed of any suitable material, such as rubber, to provide a dust-tight seal between the hopper 8 and a bin to be unloaded, as bin 14 (Figs. 2, 5 and 7). The bin 14 shown herein in Figs. 2, 5 and 7 may be the bin or receptacle of our said co-pending application, Serial Number 54,114, entitled "Shipping Container."

Figure 6:
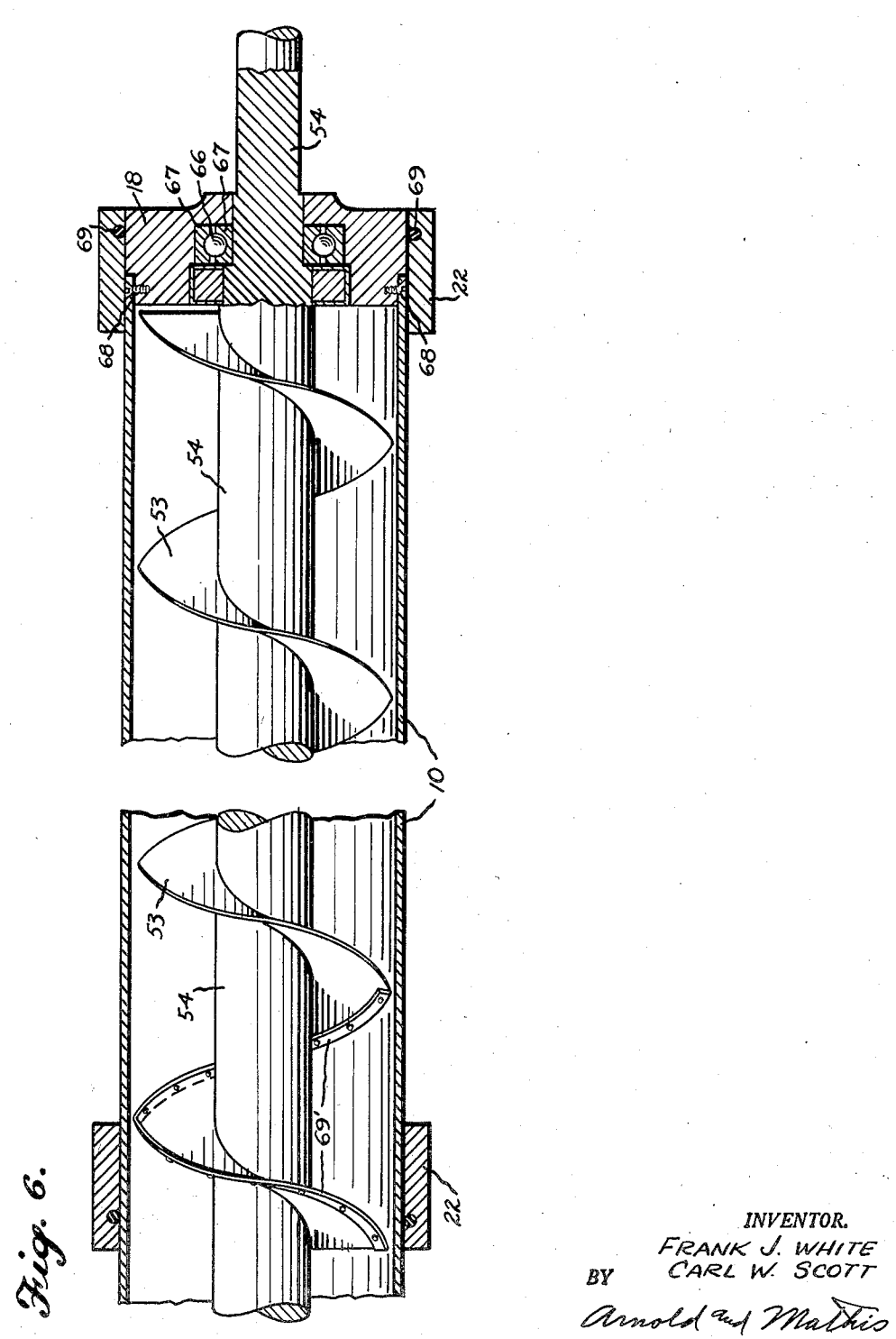
Fig. 6 is an enlarged fragmentary view in section, with parts shown in elevation, of another type of conveyor construction which may be used in this invention.

The hopper 8 is rigid with bin supporting tongue numbered generally 15, which may be accomplished by welding the side walls 16 of the tongue 15 with the arcuate bottom wall 10, as is best shown in Fig. 5 of the drawings. The platform 17 of the tongue 15 is secured to the arcuate bottom wall 10 by any suitable means, such as by securing portions 20 and 21 thereof to wall 10, as by welding (Fig. 5). Also, the end walls 9 of hopper 8 are secured to cylindrical bearing members 18 disposed at the ends of bottom wall 10 (see Fig. 1). One suitable construction thereof is shown in Fig. 6 and hereinafter described. Also the semi-circular bottom wall 10 is secured to the back wall 11, as indicated in Fig. 5, to end walls 9, and to inclined wall 19 (Fig. 5). The arcuate bottom wall member 10 and bearing members 18 may be termed a trunnion bearing. The platform 17 (see Fig. 5) has an inclined portion 20 and a horizontal portion 21, which is preferably parallel with the platform 17. The portion 21 is secured to the wall 19, as by welding. Thus, the hopper 8 and the bin supporting tongue 15 are rigidly connected and mounted for angular movement about spaced bearing members 18. Bearing members 18 are journaled in bearings formed from bottom and top cap members 22 and 23 (see Figs. 1 and 5). Bottom cap members 22 are provided with suitable flanges so the same can be secured with any suitable fixed support.

Preferably a plurality of hoppers 8, each rigidly connected with a bin supporting tongue 15, employed for blending purposes of the product being handled, as hereinafter described, and as an illustration thereof two units are clearly shown in Figs. 3 and 4 of the drawings where each unit comprises a hopper 8, a tongue 15, and associated parts. Each of the tilt unloading racks, comprising a hopper 8, a tongue 15, and associated parts, carries bin leg receiving supports numbered generally 24 (see for example Fig. 3) each for receiving therein a bin leg 25 (see Figs. 2 and 7). The device herein is particularly designed to unload bins of the construction shown in said copending application Serial Number 54,114, and such bins are provided with a cross brace and bin alining member 26 (Fig. 5) between two front legs 25 of a bin 14. In other words, the cross brace member 26 connects between the two legs between which extends the unloading door 27 (see Fig. 7) of the bin 14. When a bin is supported by a tongue 15 and parts associated therewith, the two front legs of the bin adjacent the unloading door 27 of the bin will be positioned in leg receiving supports 24; the cross brace 26 of the bin 14 will be slightly in front of the portion 20 and slightly above the portion 21 (see Fig. 5); and the back bottom portion of the bin 14 will be supported on pad 28 (see Figs. 3 and 7) carried by tongue 15. The pad 28 may be formed of any suitable resilient material, as rubber.

The tongue 15 preferably carries an unloading vibrator 29 to jar or vibrate the bin 14 and contents thereof so that granular material in the bin 14 tends to flow from the bin 14 into the hopper 8 when the hopper 8, tongue 15 and bin 14 thereon are in unloading positions. The vibrator 29 is preferably electrically operated and oscillates at relatively high frequencies so as to cause high frequency vibration of the bottom 30 of the bin 14 (Figs. 2 and 7). As indicated in said co-pending application Serial Number 54,114, bottom wall 30 of the bin 14 is of a construction so that the same may be readily oscillated at small magnitudes and at relatively high frequencies.

Thus, finely divided or granular material, as flour, sugar, grain, or the like, which does not tend to flow, if its path of flow is diverted to the horizontal and its angle of repose is reached, may be vibrated when supported on the bottom wall 30 of the bin 14 and caused to flow out of the bin 14 through the open door 27 and into the hopper 8. As high frequency vibrators may be commonly obtained on the market and the details of the same form no part of this invention, the said high frequency vibrators 29 are only diagrammatically illustrated.

A bin 14 is moved into place, by any suitable means, such as a common industrial lift truck, above platform 17 and with the front carrying the door 27 adjacent the hopper 8. As the bin is lowered by the lift truck, the cross brace 26 of the bin will engage roller 31 (see Fig. 5) and continued lowering movement of the bin 14 causes the bin 14 to move forwardly toward hopper 8 and may seal the hopper 8 to the bin 14 around the opening of door 27. In the event the bin 14 fails to move into contact with the hopper, lifting of the platform 17 with the bin thereon will positively move the bin 14 into sealed engagement with the hopper 8. The roller 31 is carried by the tongue 15 and is mounted for rotary movement. While a brace 26 having an angular face portion, as shown, and/or an inclined portion 20 will tend to urge the bin 14 toward the hopper 8, preferably the roller 31 is employed as such construction reduces friction and wear on parts.

At the same time that bin 14 is being lowered and through the action of roller 31 the bin is being moved forwardly toward the hopper 8, the two front legs 25 of the bin 14 are moving downwardly in bin leg receiving supports 24. Bin leg receiving supports 24 are rigid with hopper 8 and are generally of concave cup-like shape. Preferably each bin receiving support 24 is provided with a roller 32 (the adjacent portions of rollers 32 are spaced apart about the overall width of bin 14 at its two front legs 25) so that engagement of a bin leg 25 with either of said rollers 32 tends to move the bin toward the other roller 32 and center the bin. As the rollers 32 are on opposite sides of bin leg receiving supports 24, as the outside thereof, the said rollers 32 tend to center a bin 14 as the same is lowered by the lift truck. Again inclined portions may be used in place of the rollers 32 to cause a similar action to the rollers 32 but the rollers 32 are preferred as they reduce friction and wear on parts. Thus, a bin may be generally or substantially alined and as the bin is lowered in place the rollers 31 and 32 will precisely aline a bin 14 with a hopper 8 and cause relatively forward movement of the bin 14 so that the front portion of a bin is supported by its front legs in bin leg receiving supports 24 and at the same time a seal is provided between the bin 14 and the hopper 8 and the gasket 13 is compressed so that we have a hermetical seal.

Figure 3:
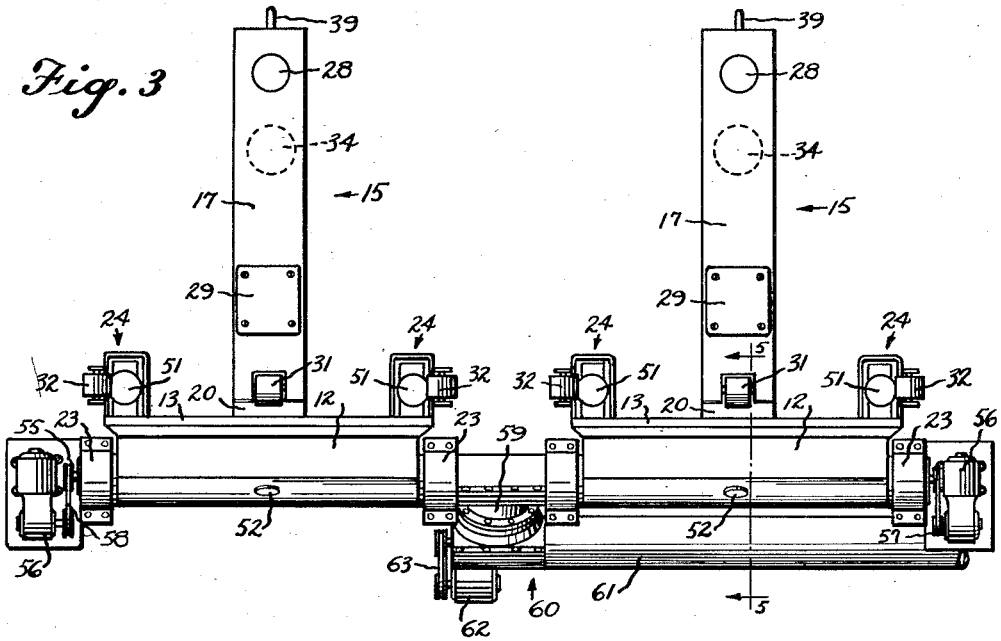
Fig. 3 is a plan view of the construction shown in Fig. 2 except no bins are shown.
Figure 4:
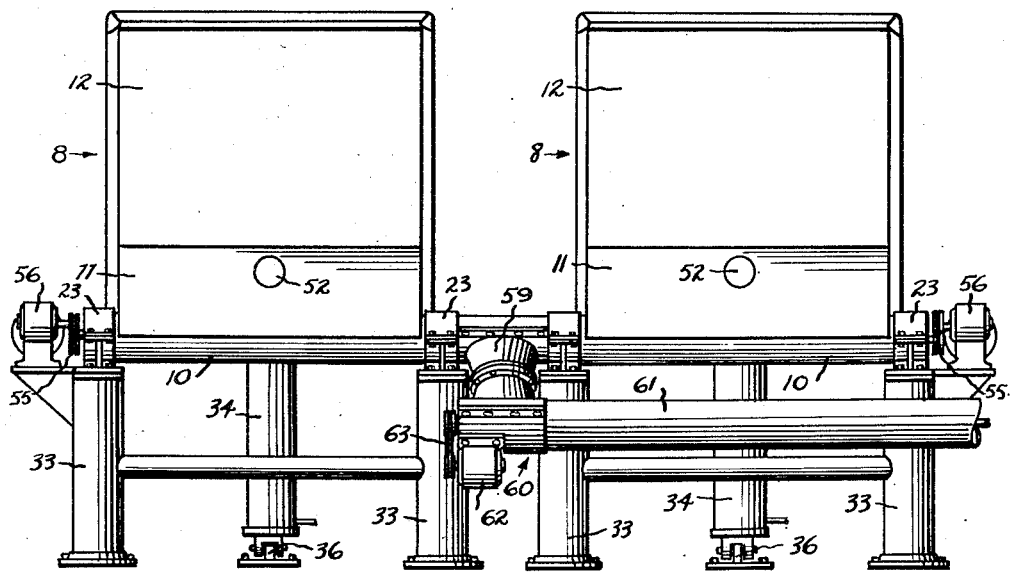
Fig. 4 is a view in side elevation of the construction shown in Fig. 3.

The bottom cap members 22 may be at floor level, as is indicated in Fig. 7 of the drawings, or said bottom cap members 22 may be at any desired elevation above the floor, as is indicated in Figs. 2, 3 and 4. In the event it is desired to support the construction at a desired elevation above the floor, the said bottom cap members 22 may be supported by fixed vertical supports 33.

It has been found desirable that bins 14 should be tilted in unloading approximately 45 degrees and such an angle is sufficient for unloading various types of materials which have been loaded in the bins 14. Thus, in this invention there is provided means to tilt the hopper 8, tongue 15, and the bin 14 supported thereon so that the bottom 30 of the bin may be initially positioned in a horizontal position and then said bottom 30 will assume an angle of approximately 45 degrees to the horizontal after the tilting mechanism and the bin thereon have been tilted or angularly moved. The tilting mechanism for the tongue 15 and parts connected therewith may be in the nature of a fluid operated piston and cylinder mechanism 34 having the upper end of the piston or cylinder pivotally connected with a lug 35 carried by the tongue 15 and having the lower end of the cylinder or piston (the other than that connected to the lug 35) pivotally connected with a fixed floor lug 36. In the construction just described, the piston and cylinder mechanism 34 and the fixed supports 33 of each unit shown in Figs. 2, 3 and 4 are such that the bins 14 are in normal untilted position, as shown in Fig. 2, and thus are at an elevation above the floor level determined by height of fixed supports 33 and piston and cylinder mechanism 34. Upon application of fluid pressure between the piston and cylinder of the piston and cylinder mechanism 34, the hopper 8, tongue 15, and bin 14 will be angularly moved about 45 degrees and to the position shown in Fig. 7 of the drawings which illustrates another form of motive power to provide for the angular tilting movement of the bin 14 and parts supporting the same. As fluid operated piston and cylinder lifting constructions (gas or liquid operated) are generally old in the art, the piston and cylinder mechanism 34 is only diagrammatically shown and described.

Referring now to Fig. 7 of the drawings, a hoist 37, which may be of the common chain type, connects between an overhead fixed supporting eye 38 and an eye 39 carried by the tongue 15. In order to insure that the hopper 8 and tongue 15 are angularly moved the desired amount and there held, the construction of the dog leg mechanism 40 shown in Fig. 7 may be employed. This dog leg mechanism 40 comprises a link 41 pivoted at one end portion to the lug 35 carried by the tongue 15 and pivoted at its other end portion to one end portion of a link 42. The other end portion of the link 42 is pivoted to any fixed floor lug, as lug 43. A plate or stop 44 is carried by one of the links 41 or 42 and abuts against the other of said links when the links have moved substantially into alinement, as is indicated in Fig. 7. When the links 41 and 42 are in the position shown in Fig. 7 of the drawings, further clockwise movement of link 41 is prevented as well as further counter-clockwise movement of link 42. However, when it is desired to return the tongue 15 to a horizontal position, the link 42 may be moved in a clockwise direction while the link 41 may be moved in a counterclockwise direction. The links 41 and 42 are pivotally connected by pivot means 45. In order to lock the links 41 and 42 together when they are in the fully extended position (preferably they are moved past center) shown in Fig. 7, a pin 46 is provided and preferably maintained readily available by securing chain 47. The pin 46 when in locking position extends through openings in links 41 and 42 and at a location removed from the pivot 45. When the links 41 and 42 are in their normal rest position, the tongue 15 rests on any suitable fixed floor support, such as support 48.

The vibrator 29 below the floor or bottom wall 30 of the bin 14 is preferably placed about one-third of the distance of the floor from the front wall of the bin 14 or the wall which engages against the gasket 13 of the hopper 8. Such location has been found very successful in providing the desired movement of vibration to the bin 14 to unload granular material therefrom. Also, it has been found that a vibrator may be placed on other walls of the bin 14, such as on the front wall thereof. As an illustration thereof, there has been shown in Fig. 7 a vibrator 49 which may be the counterpart of the vibrator 29. The vibrator 49 may be suitably supported by the hopper 8, as by a bracket 50 secured to the hopper 8 and also to the vibrator 49. In order to obtain the greatest utility of either vibrator 29 or 49 each of the bin leg receiving supports 24 is provided with a pad 51 of resilient material, as rubber. Thus, a bin 14 at the time of vibration to facilitate unloading the bin (at this time the bin is at a 45 degree angle as illustrated in Fig. 7 of the drawings) is supported by rubber pads 28 and 51 and is also supported by gasket 13. Due to such resiliency of such supporting members, the bin 14 and contents thereof may be subjected to relatively high frequency vibrations and most granular material will tend to readily flow out through the opening provided by open door 27.

As a bin 14 follows the construction of said copending application Serial Number 54,114, then an opening is provided in hopper 8 which may be opened and closed by cover 52. Cover 52 may be of the circular type (similar to gasoline tank caps) and one which is located in place by a part of a turn and released and removed by angularly turning the same amount in the opposite direction and then removed. The cover 52 should provide when closed a dust-tight seal. Thus, if a bin of said type is employed, the bin can be first moved in place and supported on pads 51 of bin leg receiving supports 24 and on pad 28. At this stage the gasket 13 will provide a seal between the front wall of the bin and around the opening of the door 27. Then by operating through the opening provided by removing cover 52, the door 27 may be released so the same will be opened by the pressure of contents moving from the bin 14 into hopper 8.

The arcuate bottom wall 10 of hopper 8 functions as a discharge chute and preferably within said discharge chute is provided a conveyor having a discharge screw 53. The screw 53 (see Figs. 1 and 6) has a shaft 54 and is driven by any suitable means, e. g. (Fig. 2), a sheave 55 is fixed on shaft 54. A prime mover, as electric motor 56, is suitably mounted and its rotor carries a sheave 57 alined with sheave 55 and said sheaves 55 and 57 are interconnected by a link belt 58. In the event that two screws 53 are employed, as is indicated in Figs. 3 and 4, they will be driven in suitable directions so that each screw will discharge into a common discharge conduit 59 (see also Fig. 4). Discharge conduit 59 connects with a discharge conveyor 60. Discharge conveyor 60 comprises a housing 61 having a screw conveyor therein, a prime mover, as electric motor 62, and means to interconnect motor 62 with the screw of the discharge conveyor 60, as link belt 63. The discharge conveyor 60 delivers material received from the discharge conduit 59 to any suitable location, e. g., in bakeries it may be desired to connect the discharge conveyor 60 with dough mixers or with bin storage hoppers. Also, in bakeries it may be desired to blend or mix the contents from a plurality of bins. In order to obtain the greatest advantages of the construction shown, preferably the electric motors 56 of the two devices shown in Figs. 3 and 4 should be variable speed so that equal or unequal proportions may be delivered from two of the bins 14 into the housing 61. While the structure of this invention has been described in part in connection with bakeries, obviously, bakery use is but one of the many uses to which structure of this invention may be applied and the benefits of this invention enjoyed.

Some granular material, as sugar, presents particular problems in connection with the bearings employed in connection with either screw conveyors comprising screw 53 or screw conveyor 60. Sugar tends to be somewhat abrasive and tends to foul bearings if ordinary bearings carried by the usual spiders are employed.

Also, the usual spiders having a plurality of arms supporting the bearing tend to choke or partially close the discharge end of a conveyor. Thus, there has been shown in Fig. 5 of the drawings a single arm 64 supporting a bearing 65 which bearing 65 may be employed in supporting the end of the shaft 54 toward the discharge. Preferably the bearing 65 supports only the discharge end of a conveyor as it permits free flow of material past the arm 64 and with a minimum of restriction to the flow of material. While the arm 64 and bearing 65 have been illustrated in Fig. 5 in connection with a screw conveyor comprising the screw 53 which cooperates with the arcuate bottom walls 10 of either of the two conveyors shown in Figs. 3 and 4, such hanger or arm 64 and bearing 65 may be used in connection with supporting the discharge end of the shaft supporting the screw in screw conveyor 60.

As there is no tendency of material to flow past the bearing at the infeed end of any one of the screw conveyors (the two screw conveyors comprising screws 53 or the one screw conveyor 60), preferably the construction of the bearing supporting the shaft of screw conveyor at the infeed end is that shown to the right in Fig. 6 of the drawings. The construction so shown includes the usual ball bearings 66 and races 67. Obviously, other types of anti-friction bearings, as roller bearings, may be employed in place of the ball bearing construction just described. As the construction in Fig. 6 of the drawings is a sectional view looking down and cutting through the bottom arcuate wall 10, a portion of a bearing member 18 is shown and said bearing member 18 is secured to said arcuate wall 10 by means of screws 68. As there is relative movement during angular or tilting movement of the hopper and tongue 15 and thus in turn of the bearing 18 relative to the cap 22, material within the conveyor may tend to move outwardly between bearing 18 and cap 22. Thus, preferably a circular gasket 69 is employed as a packing member between bearing 18 and cap members 22 and 23.

In the event that granular or abrasive material is being unloaded by the three conveyors mentioned, preferably the outfeed end of each conveyor is not provided with the bearing comprising arm 64 and bearing 65 and employs an arcuate bearing material 69' secured to the periphery of the screw 53 and for approximately one flight of the screw. This bearing material 69' may be of any suitable hardened and wear-resisting material, as "Micarta." The said material is wear-resistant and loosely fits within the housing formed by the arcuate wall 10. The bearing material 69' thus fits against and is supported by a cylindrical housing. The discharge portion of the screw conveyor thus is not in any wise restricted and there is no shaft bearing of common construction which would tend to be fouled by discharging material.

After the granular material has been discharged from either of the bins resting on the construction shown in Figs. 3 and 4 of the drawings, the tongue 15 of a particular mechanism can be lowered and the empty bin removed. If desired a full bin can replace the empty bin and the said full bin can be discharged in the manner previously described.

Thus, our construction provides an unloading device which is particularly designed for unloading receptacles or bins of the nature and design shown in our said co-pending application Serial Number 54,114. Such bins or receptacles may be generally described as having a plurality of side walls and a discharge opening in the front wall thereof, which discharge opening may be opened and closed by the door 27. The discharge opening so provided is adjacent the bottom of the receptacle 14 and the receptacle 14 is provided with front legs 25 and a cross brace or bin alining member 26 between front legs 25 of the bin 14. Our unloading device comprises a hopper numbered generally 8 having an open face or material receiving opening. Gasket means 13 surround the said material receiving opening of the hopper 8 and such gasket means 13 are preferably formed of compressible material so that upon relative motion of the hopper 8 and of the bin 14, a dust-tight seal obtains between the material receiving opening of the hopper 8 and the wall of the bin 14 in which is disposed the bin discharging opening covered by the door 27. It is not necessary to positively center and aline a bin 14 on tongue 15 as the bin leg receiving supports 24 will cause a bin to move from one side to the other by reason of rollers 32. Also, it is not necessary to positively seal the bin 14 against gasket 13 as the roller 31 by engagement with crossbrace or bin alining member 26 provides for relative movement between the bin 14 and the hopper 8 as the bin 14 is lowered into place. Also as the tongue 15 angularly moves, the weight of the bin urges the same against the gasket 13. The tongue 15 is rigidly connected with the hopper 8 and the tongue 15 supports the bottom portion 30 of the bin 14 on pad 28 and when the bin is in supported position it is abutted against the gasket 13 of the hopper 8. Pivot means connected with the hopper 8 and the tongue 15 include trunnion bearings 18 which are mounted for angular movement in the bearings provided by caps 22 and 23 and thus the said hopper 8, tongue 15, and the bin 14 loaded thereon are supported for angular movement to permit the bottom 30 of the bin 14 to be angularly moved approximately 45 degrees to the horizontal and to thus discharge the contents of the receptacle 14 into the hopper 8. While the bin 14 is in unloading position, its bottom 30 is supported on resilient pad 28, its two front legs are supported on resilient pads 51 in bin leg receiving supports 24, and its front wall is supported by resilient gasket 13. Thus, the bin may be readily vibrated at high frequencies because of its resilient support which may be accomplished by vibrator 29 carried by tongue 15 or vibrator 49 connected with hopper 8.

Preferably the bottom of the hopper 8 is in the form of a semi-cylinder, as arcuate wall 10. Such bottom arcuate wall 10 forms the bottom wall portion of a screw type of conveyor, such as a screw type conveyor employing screw shaft 54 and screw 53. Preferably the devices are used in multiples so that two screw conveyors feed toward a common discharge, as discharge conduit 59 permitting blending of the contents discharging from a plurality of bins in equal or unequal parts as screws 53 may be of unlike pitch and a constant speed or of like pitch and driven at unlike speeds. Preferably the screw type conveyor employs the bearing material 69' of Fig. 6 resting on the internal circumference of the conveyor housing so that the conveyor is not limited as to the type of materials which it will handle or the screw type conveyors preferably employ the hanger construction shown in Fig. 5 where we have a single arm 64 supporting a shaft bearing 65. Also, preferably the hopper 8 is provided with a cover 52 so that the door mechanism 27 of a bin 14 may be opened after a bin is in place and sealed against the gasket 13 of the hopper 8.

Obviously, changes may be made in the forms, dimensions, and arrangement of the parts of our invention without departing from the principle thereof, the above setting forth only preferred forms of embodiment.

We claim:

1. An unloading device for receptacles having side and bottom walls and a discharge opening in one thereof and adjacent the bottom of said receptacle comprising a hopper having a material receiving opening; gasket means surrounding said material receiving opening and sealable between the same and the wall of said receptacle having said discharge opening therein, and around said discharge opening; tongue means rigidly connected with said hopper for supporting the bottom portion of a receptacle and with said receptacle abutted against said hopper; and pivot means connected with said hopper and said tongue means to permit angular movement thereof and of a receptacle supported on said tongue to discharge the contents of said receptacle into said hopper.

2. The combination of claim 1 wherein said hopper has an arcuate bottom portion forming the housing of a conveyor.

3. The combination of claim 2 wherein a screw type conveyor is positioned in said arcuate bottom portion.

4. The combination of claim 3 wherein said screw type conveyor at the material discharge portion thereof is supported from a single arm and a bearing supported thereby.

5. The combination of claim 3 wherein said screw type conveyor at the material discharge portion thereof is supported by a bearing member disposed at the periphery of the screw of the conveyor and which bearing bears against the inside surface of the arcuate bottom portion of the housing of the conveyor.

6. An unloading device for receptacles having side and bottom walls and a discharge opening in one thereof and adjacent the bottom of said receptacle comprising a hopper having a material receiving opening; gasket means surrounding said material receiving opening and sealable between the same and the wall of said receptacle having said discharge opening therein and around said discharge opening; tongue means rigidly connected with said hopper for supporting the bottom portion of the receptacle and with said receptacle abutting against said hopper; pivot means connected with said hopper and said tongue means to permit angular movement thereof and of a receptacle supported on said tongue to discharge the contents of said receptacle into said hopper; and a vibrator member connected with one wall of said receptacle to vibrate the same and facilitate discharge of granular material from said receptacle.

7. The combination of claim 6 wherein said vibrator member contacts the bottom wall of said receptacle.

8. The combination of claim 6 wherein said vibrator member contacts the side wall of said receptacle adjacent said hopper.

9. An unloading device for receptacles having side and bottom walls and a discharge opening in one thereof and adjacent the bottom of said receptacle comprising a hopper having a material receiving opening; gasket means surrounding said material receiving opening and sealable between the same and the wall of said receptacle having said discharge opening therein and around said discharge opening; tongue means rigidly connected with said hopper; bin supporting means carried by said tongue means comprising resilient pad members disposed between the tongue means and the supported bottom portion of said receptacle to resiliently support a receptacle abutted against said hopper and permit vibratory movement of said receptacle; pivot means connected with said hopper and said tongue means to permit angular movement thereof and of a receptacle supported on said tongue to discharge the contents of said receptacle into said hopper; and a vibrator member connected with one wall of said receptacle to vibrate the same and facilitate discharge of granular material from said receptacle.

10. An unloading device for receptacles having a discharge opening in a wall thereof adjacent the bottom thereof and having footed portions elevating the bottom of the receptacle above a supporting surface; a hopper having a material receiving opening against which said discharge opening of the receptacle is to be abutted; tongue means rigidly connected with said hopper; receptacle supporting means carried by said tongue means and comprising a plurality of spaced receptacle leg troughs laterally urging receptacle legs to predetermined positions which are inserted into said troughs to aline a receptacle and urge the same against said hopper; and pivot means connected with said hopper and said tongue means to permit angular movement thereof and of a receptacle supported on said tongue to discharge the contents of said receptacle into said hopper.

11. The combination of claim 10 wherein said receptacle leg troughs comprise rotatably mounted rollers mounted on horizontal axes to be engaged by legs of a receptacle as they are lowered therepast.

12. An unloading device for receptacles having a discharge opening in a wall thereof adjacent the bottom thereof and having a cross brace below the bottom thereof and adjacent one wall thereof; a hopper having a material receiving opening against which said discharge opening the opening of the receptacle is to be abutted; tongue means rigidly connected with said hopper and supporting the bottom portion of a receptacle; bin alining means carried by said tongue means and in the path of downward movement of said cross brace carried by said bin and laterally urging said cross brace toward said hopper and abutting said receptacle against said hopper; and pivot means connected with said hopper and said tongue means to permit angular movement thereof and of a receptacle supported on said tongue to discharge the contents of said receptacle into said hopper.

13. The combination of claim 12 wherein said bin alining means comprises rotatably mounted roller means mounted on a horizontal axis to be engaged by said cross brace as they are lowered therepast.

14. An unloading device for receptacles having a discharge opening in a wall thereof adjacent the bottom thereof and having a releasable door for covering said opening having releasing mechanism; a hopper having a material receiving opening against which said discharge opening of the receptacle is to be abutted and having an opening therein alined with the door releasing means of said door of said receptacle; a releasable door for said opening in said hopper to permit manipulation therethrough of said door releasing mechanism of said receptacle; tongue means rigidly connected with said hopper for supporting the bottom portion of a receptacle and with said receptacle abutted against said hopper; and pivot means connected with said hopper and said tongue means to permit angular movement thereof and of a receptacle supported on said tongue to discharge the contents of said receptacle into said hopper.

15. An unloading device for receptacles having a discharge opening in a wall thereof adjacent the bottom thereof and comprising a plurality of hoppers each having a material receiving opening; gasket means surrounding each of said material receiving openings and sealable between the same and the wall of a receptacle and around the discharge opening therein; a tongue means rigidly connected with each of said hoppers for supporting the bottom portion of a receptacle thereon and with the receptacle abutted against the hopper; pivot means connecting each hopper with one of said tongue means to permit angular movement of the connected hopper and tongue means and the receptacle supported thereon to discharge the contents of the receptacle into the hopper involved; and a plurality of conveyor means feeding into a common discharge and connected respectively to said hoppers.

16. The combination of claim 15 wherein the conveyors comprise screw type conveyors.

FRANK J. WHITE.
CARL W. SCOTT.

No references cited.